US012698097B2

(12) United States Patent
Shimizu et al.

(10) Patent No.: US 12,698,097 B2
(45) Date of Patent: Aug. 4, 2026

(54) CONTROL DEVICE AND CONTROL METHOD

(71) Applicant: Hitachi, Ltd., Tokyo (JP)

(72) Inventors: Taku Shimizu, Tokyo (JP); Takahiro Ito, Tokyo (JP); Mikio Bando, Tokyo (JP); Mitsuru Matsubara, Tokyo (JP)

(73) Assignee: HITACHI, LTD., Tokyo (JP)

( * ) Notice: Subject to any disclaimer, the term of this patent is extended or adjusted under 35 U.S.C. 154(b) by 63 days.

(21) Appl. No.: 18/834,252

(22) PCT Filed: Dec. 13, 2022

(86) PCT No.: PCT/JP2022/045917
§ 371 (c)(1),
(2) Date: Jul. 30, 2024

(87) PCT Pub. No.: WO2023/153071
PCT Pub. Date: Aug. 17, 2023

(65) Prior Publication Data
US 2025/0157346 A1 May 15, 2025

(30) Foreign Application Priority Data
Feb. 8, 2022 (JP) ................................. 2022-017678

(51) Int. Cl.
*G08G 5/80* (2025.01)
*B64F 1/36* (2017.01)
(Continued)

(52) U.S. Cl.
CPC ................. *B64F 1/36* (2013.01); *G08G 5/56* (2025.01); *G08G 5/727* (2025.01); *G08G 5/80* (2025.01)

(58) Field of Classification Search
CPC . B64F 1/36; G08G 5/56; G08G 5/727; G08G 5/80; G08G 5/00; G08G 5/26; G08G 5/34; G08G 5/55; G08G 5/57
See application file for complete search history.

(56) References Cited

U.S. PATENT DOCUMENTS

| | | | | |
|---|---|---|---|---|
| 4,823,272 A | * | 4/1989 | Inselberg | G01S 13/91 701/120 |
| 5,047,946 A | * | 9/1991 | King | G01S 5/12 73/178 R |

(Continued)

FOREIGN PATENT DOCUMENTS

| | | | | |
|---|---|---|---|---|
| CA | 2768249 A1 | * | 8/2012 | G08G 5/56 |
| CA | 2823366 A1 | * | 2/2014 | G08G 5/723 |

(Continued)

OTHER PUBLICATIONS

"Emerging cockpit technologies for free flight;" Chang et al., 15th Dasc. AIAA/IEEE Digital Avionics Systems Conference (1996, pp. 63-71); Jan. 1, 1996. (Year: 1996).*

(Continued)

*Primary Examiner* — Khoi H Tran
*Assistant Examiner* — Jorge O Peche
(74) *Attorney, Agent, or Firm* — MATTINGLY & MALUR, PC

(57) ABSTRACT

Provided are a control device and a control method by which an airplane can maintain flight while maintaining a high level of safety, even if there is a conceivable abnormal event such as a communication failure or an obstacle. This control device is for an airplane, the control device being characterized by: comprising a setting unit that sets a main flight route, which is a normal flight route, and at least one secondary flight route, for each of a plurality of airplanes, and a management unit that prevents interference between a given main flight route and a given secondary flight route, (Continued)

and a main flight route and secondary flight route of another airplane; obtaining information about an airplane or the surrounding airspace; and when the information matches a preset prescribed condition, permitting the airplane to operate using the secondary flight route.

9 Claims, 3 Drawing Sheets

(51) Int. Cl.
 *G08G 5/56* (2025.01)
 *G08G 5/72* (2025.01)

(56) References Cited

U.S. PATENT DOCUMENTS

| | | | | | |
|---|---|---|---|---|---|
| 5,173,861 | A | * | 12/1992 | Inselberg | G08G 5/53 |
| | | | | | 701/120 |
| 5,340,061 | A | * | 8/1994 | Vaquier | G08G 5/21 |
| | | | | | 244/175 |
| 5,627,546 | A | * | 5/1997 | Crow | G08G 5/56 |
| | | | | | 342/353 |
| 5,872,526 | A | * | 2/1999 | Tognazzini | G08G 5/25 |
| | | | | | 340/961 |
| 6,020,831 | A | * | 2/2000 | Nishida | G08G 5/56 |
| | | | | | 340/972 |
| 6,085,147 | A | * | 7/2000 | Myers | G01C 21/3492 |
| | | | | | 342/36 |
| 6,314,362 | B1 | * | 11/2001 | Erzberger | G08G 5/56 |
| | | | | | 340/961 |
| 6,463,383 | B1 | * | 10/2002 | Baiada | G08G 5/727 |
| | | | | | 342/36 |
| 7,248,963 | B2 | * | 7/2007 | Baiada | G08G 5/26 |
| | | | | | 342/36 |
| 8,606,491 | B2 | * | 12/2013 | Subbu | G08G 5/56 |
| | | | | | 342/36 |
| 8,744,738 | B2 | * | 6/2014 | Bushnell | G08G 5/25 |
| | | | | | 701/4 |
| 9,334,052 | B2 | * | 5/2016 | Pasko | G05D 1/0005 |
| 9,536,435 | B1 | * | 1/2017 | Shay | G08G 5/21 |
| 10,043,405 | B1 | * | 8/2018 | Chartier | G08G 5/54 |
| 10,957,209 | B2 | * | 3/2021 | Campos Macias | G08G 5/34 |
| 11,079,757 | B1 | * | 8/2021 | Duksta | G05D 1/0022 |
| 11,113,976 | B2 | * | 9/2021 | Chambers | G08G 5/30 |
| 11,631,337 | B2 | * | 4/2023 | Itabashi | G08G 5/21 |
| | | | | | 701/301 |
| 12,435,981 | B2 | * | 10/2025 | Scott | G01C 23/00 |
| 2003/0078719 | A1 | * | 4/2003 | Zobell | G08G 5/76 |
| | | | | | 342/36 |
| 2012/0209457 | A1 | * | 8/2012 | Bushnell | G08G 5/723 |
| | | | | | 701/4 |
| 2012/0215433 | A1 | * | 8/2012 | Subbu | G06Q 50/40 |
| | | | | | 701/120 |
| 2012/0215434 | A1 | * | 8/2012 | Subbu | G08G 5/26 |
| | | | | | 701/120 |

| | | | | | |
|---|---|---|---|---|---|
| 2012/0280087 | A1 | * | 11/2012 | Coffman | G05D 1/0016 |
| | | | | | 244/175 |
| 2014/0316616 | A1 | * | 10/2014 | Kugelmass | G05D 1/0094 |
| | | | | | 701/8 |
| 2015/0336668 | A1 | * | 11/2015 | Pasko | G05D 1/0005 |
| | | | | | 701/2 |
| 2018/0286257 | A1 | * | 10/2018 | Schwartz | G08G 5/22 |
| 2019/0051197 | A1 | * | 2/2019 | Campos Macias | G08G 5/80 |
| 2019/0265705 | A1 | * | 8/2019 | Zhang | G05D 1/0022 |
| 2019/0369613 | A1 | * | 12/2019 | Moon | G05D 1/0033 |
| 2020/0202730 | A1 | * | 6/2020 | Nayak | G08G 5/55 |
| 2020/0244344 | A1 | * | 7/2020 | Kosseifi | H04W 4/026 |
| 2020/0249701 | A1 | | 8/2020 | Murata et al. | |
| 2021/0166572 | A1 | * | 6/2021 | Kim | G06T 13/20 |
| 2021/0350716 | A1 | * | 11/2021 | Gariel | G08G 5/56 |
| 2022/0053607 | A1 | * | 2/2022 | Rice | H04W 8/183 |
| 2022/0170746 | A1 | * | 6/2022 | Hou | G06F 3/04847 |
| 2023/0286556 | A1 | * | 9/2023 | Qian | G05D 1/106 |
| 2024/0251336 | A1 | * | 7/2024 | Yan | H04W 64/00 |
| 2024/0253812 | A1 | * | 8/2024 | Raynaud | G01C 23/00 |
| 2025/0157346 | A1 | * | 5/2025 | Shimizu | G08G 5/34 |

FOREIGN PATENT DOCUMENTS

| | | | | | |
|---|---|---|---|---|---|
| CN | 105096662 | A | * | 11/2015 | G08G 5/00 |
| CN | 114721413 | A | * | 7/2022 | G05D 1/0808 |
| CN | 115409437 | A | * | 11/2022 | G06Q 10/0635 |
| CN | 117519255 | A | * | 2/2024 | |
| CN | 112166394 | B | * | 10/2024 | G05D 1/101 |
| EP | 3998594 | A1 | * | 5/2022 | G08G 5/80 |
| JP | 2002-117500 | A | | 4/2002 | |
| JP | 2003-044998 | A | | 2/2003 | |
| JP | 2009-251729 | A | | 10/2009 | |
| JP | 2010067136 | A | * | 3/2010 | |
| JP | 2012-174266 | A | | 9/2012 | |
| JP | 5118588 | B2 | * | 1/2013 | |
| JP | 2013-033474 | A | | 2/2013 | |
| JP | 2018-200676 | A | | 12/2018 | |
| JP | 2019-091288 | A | | 6/2019 | |
| JP | 2020-118657 | A | | 8/2020 | |
| JP | 2021-096579 | A | | 6/2021 | |
| KR | 20180074325 | A | * | 7/2018 | G06F 3/04815 |

OTHER PUBLICATIONS

"Control of Multivehicle Aerospace Systems;" Samad et al., Wiley-IEEE Press 2000; Jan. 1, 2000. (Year: 2000).*

"The human element in Automatic Dependent Surveillance-Broadcast flight operations;" Livack et al., 19th DASC. 19th Digital Avionics Systems Conference. Proceedings (Cat. No. 00CH37126) (vol. 2, 2000, pp. 5D4/1-5D412 vol. 2); Jan. 1, 2000. (Year: 2000).*

International Search Report of PCT/JP2022/045917 dated Feb. 7, 2023.

Japanese Office Action received in corresponding Japanese Application No. 2022-017678 dated Mar. 5, 2025.

\* cited by examiner

CONTROL DEVICE AND CONTROL METHOD

TECHNICAL FIELD

The present invention relates to a control device and a control method of a moving body, such as an aircraft, which needs to avoid collisions with surrounding objects.

BACKGROUND ART

Current control services for aircrafts are performed by, for example, a traffic controller instructing each aircraft on a flight path based on the traffic controller's thoughts, discretion, and the like, based on radar information, information transmitted from each aircraft, and the like. However, there are concerns that if the volume of air traffic increases in association with an increase in passenger demand and a widespread use of unmanned aircrafts in the future, the burden on the traffic controllers will increase and hinder safe guidance operations with the current control service as it is. Therefore, improving the efficiency of the control system is an issue.

Therefore, for example, Patent Literature 1 proposes a control method for improving the efficiency of control by solving an optimization problem for providing paths from entering a controlled airspace to exiting the controlled airspace to a plurality of aircrafts existing in the controlled airspace of a control station, under the condition that does not cause a collision.

Patent Literature 2 proposes a control method for maintaining a distance between respective aircrafts at a specified value or more by calculating a point and a distance at which the distance between the respective aircrafts is the shortest from a current position of a plurality of aircrafts and scheduled flight path information, and correcting the flight path of the aircraft when the distance is expected to be below the specified value.

CITATION LIST

Patent Literature

Patent Literature 1: Japanese Unexamined Patent Application Publication No. 2009-251729
Patent Literature 2: Japanese Unexamined Patent Application Publication No. 2013-033474

SUMMARY OF INVENTION

Technical Problem

In an actual control system, for example, when the aircraft detects an obstacle on the flight path, such as a flock of birds or thunderclouds, which have not been recognized by the control side, the aircraft is preferred to take an avoidance action to avoid a collision with the obstacle. However, the methods disclosed in Patent Literature 1 and Patent Literature 2 do not assume that the aircraft deviates from the flight path instructed by the control station. Therefore, when the aircraft deviates from the flight path instructed by the control station, the control station needs to reset the flight path for an aircraft around the aircraft, but when the resetting takes time, there is a risk that a state of reduced safety continues until the resetting is completed.

There is also a risk that a communication failure occurs in communication between the aircraft and the control station to interrupt or delay the communication, but the inventions disclosed in Patent Literature 1 and Patent Literature 2 do not assume a communication failure, and are based on the premise that each aircraft follows the flight path instructed by the control station. Therefore, when an abnormal event such as a communication failure occurs during flight, the flight path cannot be updated and each aircraft is required to autonomously ensure the safety of the flight path at its own discretion, resulting in a risk of reducing the safety.

The present invention has been made in view of the above circumstances, and an object thereof is to provide a control device and a control method that allows an aircraft to maintain flight while maintaining high safety even when a conceivable abnormal event such as a communication failure or an obstacle occurs.

Solution to Problem

According to the above, the present invention provide "a control device for an aircraft including: a setting unit that sets, for each of a plurality of aircrafts, a primary flight path as a normal flight path and at least one or more secondary flight paths; a management unit that avoids an interference of the primary flight path and the secondary flight path with a primary flight path or a secondary flight path of another aircraft; and a control unit that obtains information on an aircraft or surrounding airspace and permits the aircraft to operate on the secondary flight path when the information meets a preset predetermined condition."

In accordance with the present invention, "a control method for an aircraft is provided which includes: setting a primary flight path as a normal flight path and at least one or more secondary flight paths for each of a plurality of aircrafts; avoiding an interference of the primary flight path and the secondary flight path with a primary flight path or a secondary flight path of another aircraft; and permitting the aircraft to operate on the secondary flight path when information on an aircraft or surrounding airspace meets a preset predetermined condition."

Advantageous Effects of Invention

According to the present invention, even when a conceivable abnormal event such as a communication failure or an obstacle occurs, an aircraft can maintain flight while maintaining high safety.

According to embodiments of the present invention, for a conceivable event such as an occurrence of a communication failure or a detection of an obstacle, the control station sets the occurrence of the event as a predetermined condition in advance, and sets a flight path that can deal with the event as a secondary flight path corresponding to the predetermined condition. In case of occurrence of the event, this allows the system to immediately select a flight on the secondary flight path corresponding to the predetermined condition that deals with the event, and the aircrafts can continue the flight reliably without risking a collision with each other.

DESCRIPTION OF EMBODIMENTS

The following describes the embodiments of the present invention with reference to the drawings.

First Embodiment

Figure 1:
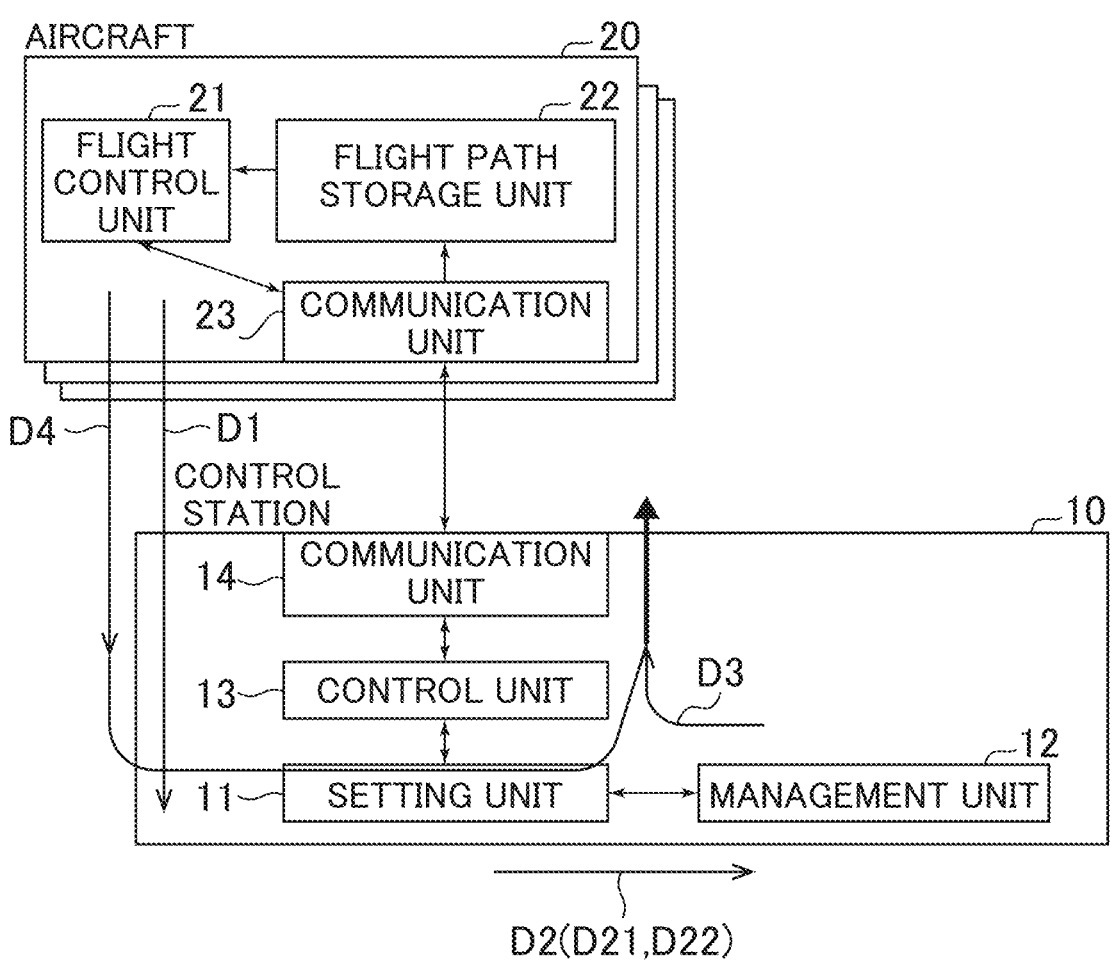
FIG. 1 is a block diagram illustrating an exemplary functional configuration of a control system according to a first embodiment of the present invention.

FIG. 1 is a block diagram illustrating an exemplary functional configuration of a control system according to a first embodiment of the present invention. The control system is a system in which a control station 10 and one or a plurality of aircrafts 20 are configured in cooperation with each other.

Among them, the control station 10 includes a setting unit 11, a management unit 12, a control unit 13, and a communication unit 14. The control unit 13 can communicate with the setting unit 11, and the control unit 13 can also communicate with the plurality of aircrafts 20 via the communication unit 14. The setting unit 11, the management unit 12, and the control unit 13 in the control station 10 are constructed, for example, as software on a computer on the ground, and the communication unit 14 is constructed, for example, as a wireless communication device using radio waves or light.

Each of the aircrafts 20 has a flight control unit 21, a flight path storage unit 22, and a communication unit 23, and the flight path storage unit 22 and the flight control unit 21 can each communicate with the control station 10 via the communication unit 23. Hereinafter, when it is clear that the communication between the respective functional blocks is preformed via the communication unit 14 and the communication unit 23, the description thereof may be omitted. The aircraft 20 is an aircraft that performs a flight. The flight control unit 21 and the flight path storage unit 22 are constructed, for example, as software on a computer mounted on the aircraft 20, and the communication unit 23 is constructed, for example, as a wireless communication device using radio waves or light. However, the method for constructing the system in the aircraft is not limited to this, and for example, a method in which the functions of the flight control unit 21 and the flight path storage unit 22 are performed by a human such as a pilot, which is so-called manual operation, may be used.

Hereinafter, an operation of the control station 10 side will be described first. The operation of the control station 10 includes a setting situation and an operating situation based on the setting. First, the setting situation will be described.

First, when the aircraft 20 is present in a controlled airspace of the control station 10, the control unit 13 obtains a destination point of the aircraft 20 and information D1 on the aircraft 20, such as a possible flight time, a possible flight distance, specifications of the aircraft 20, or data regarding flight performance, from the flight control unit 21 in the aircraft 20.

Then, the control unit 13 transmits a part or all of the information D1 on the aircraft 20 and a predetermined condition L for making a secondary flight path available, which will be described later, to the setting unit 11. Here, the predetermined condition L is set on the assumption of a danger on a flight path, such as unstable weather in a certain airspace. This assumption may take into account the current airspace state or may be hypothetical.

The setting unit 11 inputs, from the control unit 13, the information D1 on the aircraft 20 and the predetermined condition L for making the secondary flight path available, and communicates with the management unit 12 to confirm that there is no interference with a flight path of another aircraft 20, while setting a primary flight path D21 as a path on which the aircraft 20 should normally fly, and one or more secondary flight paths D22 available only when the predetermined condition Lis satisfied. The generation of information D2 (primary flight path D21 and secondary flight path D22) on flight path for each aircraft 20 in the setting unit 11 is performed for all the aircrafts 20 present in the controlled airspace.

The management unit 12 stores the information D2 (primary flight path D21 and secondary flight path D22) on the flight path set for the plurality of aircrafts 20 by the setting unit 11, and when the setting unit 11 generates the flight path, the management unit 12 stores the information D2 on the path after confirming that the flight path does not interfere with a flight path of another aircraft.

The management unit 12 also gives the setting unit 11 a use permission D3 for the flight path of the aircraft that has been confirmed not to interfere with a flight path of an aircraft. The timing at which the use permission D3 is given to the setting unit 11 may be immediately after the information D2 on the flight path is confirmed, or the use permission D3 may be transmitted as appropriate in response to a request from the control unit 13 in the operating state.

Next, the operation of the control station 10 side in the actual operating situation will be described. First, the control unit 13 receives the information D1 on the aircraft 20 and information D4 on airspace around the aircraft 20 from the flight control unit 21. On the other hand, the control unit 13 selects an appropriate flight path from the primary flight path D21 and the secondary flight path D22 and transmits it to the aircraft 20.

Next, the control on the aircraft 20 side in the actual operating situation will be described. The flight control unit 21 drives various actuators installed on the aircraft 20 based on the information D2 on the flight path stored in the flight path storage unit 22, controls the aircraft 20 to follow the flight path, and transmits the information D1 on the aircraft 20 and the information D4 on the airspace around the aircraft 20 to the control unit 13. The flight path storage unit 22 also stores the information D2 on the flight path transmitted from the control unit 13 and transmits it to the flight control unit 21.

The aircraft 20 transmits the information D1 on the aircraft 20 and the information D4 on the airspace around the aircraft 20 to the control unit 13. Alternatively, at a pilot's discretion, the aircraft 20 transmits a problem on the aircraft or the flight path to the control station 10. These are recognized by the control station 10 as an alert signal from the aircraft, and when the alert signal meets a preset predetermined condition, the control unit 13 replies the aircraft 20 with the use permission D3 for the secondary flight path D22 upon detecting the alert.

Figure 2:
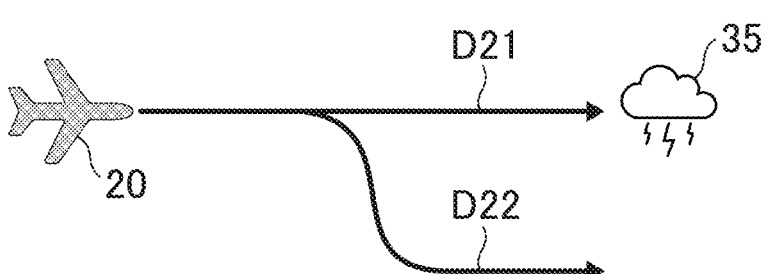
FIG. 2 is a schematic diagram of a flight path when an obstacle is avoided using the present invention.

According to the present invention, for example, as shown in FIG. 2, even when an obstacle 35 to be avoided, such as thunderclouds, of which the control station 10 is not aware, is present on the primary flight path D21 initially designated by the control station 10, it is possible to safely control the aircraft 20 by switching to and operating on the secondary flight path D22 available only when the predetermined condition L is satisfied.

When the present invention is not used, for example, the aircraft 20 may require the control station 10 to correct the flight path D21 upon detecting the obstacle 35, but if the flight path of another aircraft is set around the flight path D21, the correction of the flight path D21 cannot be made immediately. Therefore, the aircraft 20 may be forced to accept a risk of collision with the obstacle 35, or may be forced to accept an increased risk of collision with another aircraft and make a flight deviating from the flight path D21.

On the other hand, with the present invention, for example, a case in which a flight on the primary flight path D21 is determined to be dangerous is defined in advance as the predetermined condition L, and for example, the secondary flight path D22 is set as a secondary flight path corresponding to the predetermined condition L. This allows the control unit 13 to immediately select the secondary flight path D22 and transmit the flight path to the flight path storage unit 22 upon receiving the information on the obstacle 35 from the flight control unit 21, making it possible to instruct a safe avoidance action without risking a collision with another aircraft.

Second Embodiment

Figure 3:
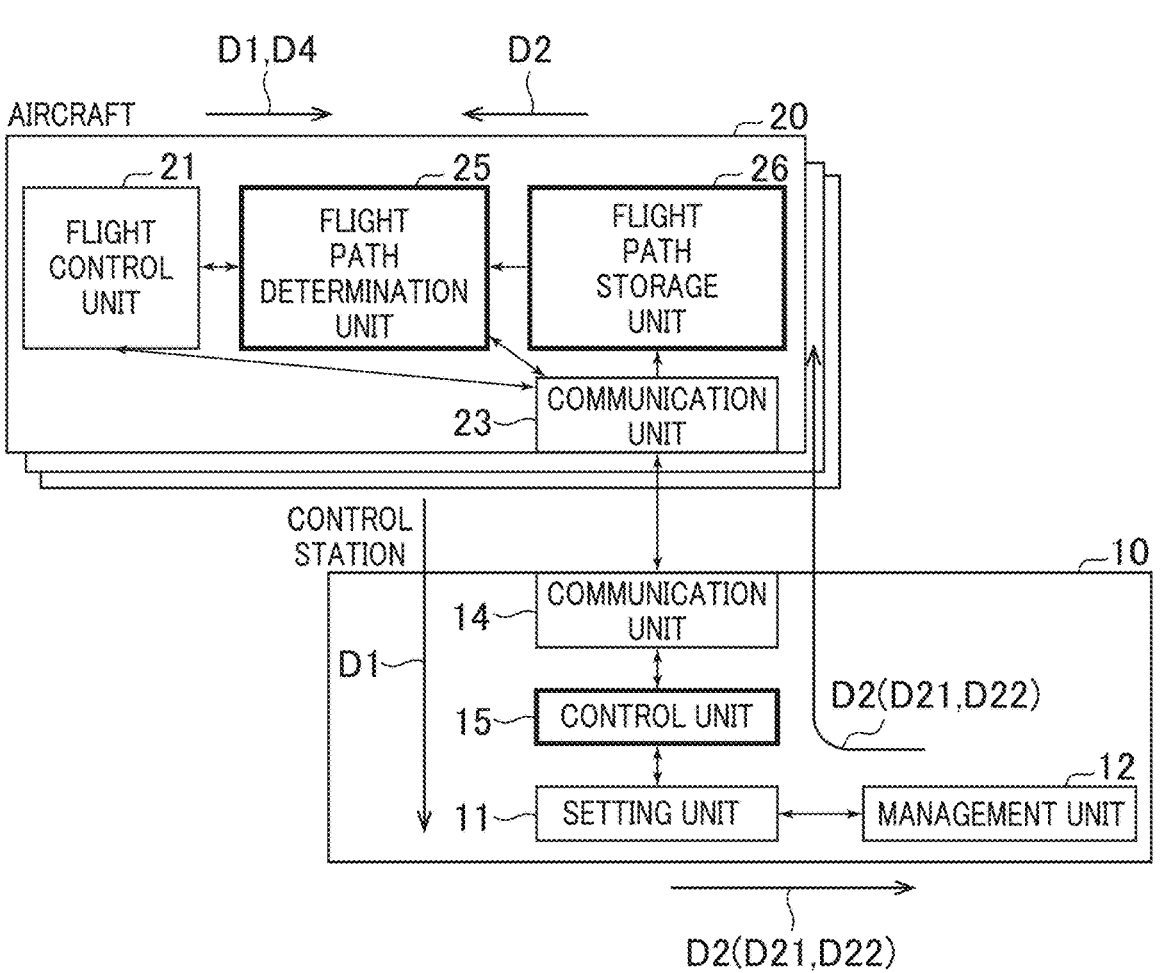
FIG. 3 is a block diagram illustrating an exemplary functional configuration of a control system according to a second embodiment of the present invention.

FIG. 3 is a block diagram illustrating an exemplary functional configuration of a control system according to a second embodiment of the present invention. FIG. 3 is a block diagram illustrating an exemplary functional configuration of an embodiment in which information on the primary flight path D21, the predetermined condition L, and the secondary flight path D22 is shared with the aircraft 20.

In the first embodiment, after receiving the alert signal from the aircraft 20, the use permission D3 for the secondary flight path D22 whose safety is ensured in advance is transmitted to the aircraft 20. However, in the second embodiment, the secondary flight path D22 whose safety is ensured in advance is held in the aircraft 20, and the secondary flight path D22 can be used at the discretion of the aircraft 20 side.

In the second embodiment, compared to the first embodiment, the control unit 13 is replaced with a control unit 15, the flight path storage unit 22 is replaced with a flight path storage unit 26, and a flight path determination unit 25 is added. This allows not only the primary flight path D21 but also the predetermined condition L and the secondary flight path D22 to be shared with the aircraft 20 by the control station 10.

Similarly to the control unit 13, when the aircraft 20 is present in the controlled airspace, which is the airspace managed by the control station 10, the control unit 15 obtains the destination point of the aircraft 20 and the information D1 on the aircraft 20, such as a possible flight time, a possible flight distance, specifications of the aircraft, or data regarding flight performance, from the flight control unit 21.

The control unit 15 transmits a part or all of the information D1 on the aircraft 20 and the predetermined condition L to the setting unit 11, and obtains the primary flight path D21 and the secondary flight path D22 corresponding to the predetermined condition L from the setting unit 11. Then, the control unit 15 transmits the set primary flight path D21, a part or all of the information on the predetermined conditions L and the secondary flight path to the flight path storage unit 26 in the aircraft 20. The flight path storage unit 26 stores the information D2 on the primary flight path D21, the predetermined condition L and the secondary flight path D22 transmitted from the control unit 15.

The flight path determination unit 25 selects an appropriate flight path based on the information D1 on the aircraft 20 and the information D4 on the airspace around the aircraft 20 that are received from the flight control unit 21 and the information D2 on the primary flight path D21, the predetermined condition L, and the secondary flight path D22 that are stored in the flight path storage unit 26, and transmits the appropriate flight path to the flight control unit 21, and transmits the information on the selected flight path to the control unit 15.

According to the present embodiment, even when the aircraft 20 cannot communicate with a control station 10 due to a communication failure between the communication unit 14 and the communication unit 23 or the like, and the flight path cannot be instructed by the control unit 15, for example, by defining a case where a communication failure occurs as the predetermined condition L and setting a point outside the controlled airspace of the control station 10 or a path to the emergency landing site as the flight path corresponding to the predetermined condition L, the aircraft 20 autonomously selects the secondary flight path, making it possible to perform a safe avoidance action without increasing the risk of collision with another aircraft.

In the above embodiment, an example in which the predetermined condition L and the secondary flight path D22 are shared via communication between the control station 10 and the aircraft 20 are shown. However, a part or all of the predetermined condition L and the secondary flight path D22 may be shared in accordance with a predefined rule. In the embodiment, the flight path determination unit 25 and the flight path storage unit 26 do not need to constantly receive the information on the secondary flight path D22 from the control station 10 during flight, allowing for reduced communication volume and simplified processing.

In the above embodiment, for each secondary flight path D22 provided by the control station 10, the aircraft 20 may explicitly instruct the control station 10 to release the secondary flight path D22 when there is no longer a possibility of selecting the secondary flight path D22. This allows the control station 10 to delete the secondary flight path D22 that is no longer needed and quickly set a new flight path that interferes with the secondary flight path D22.

Figure 4:
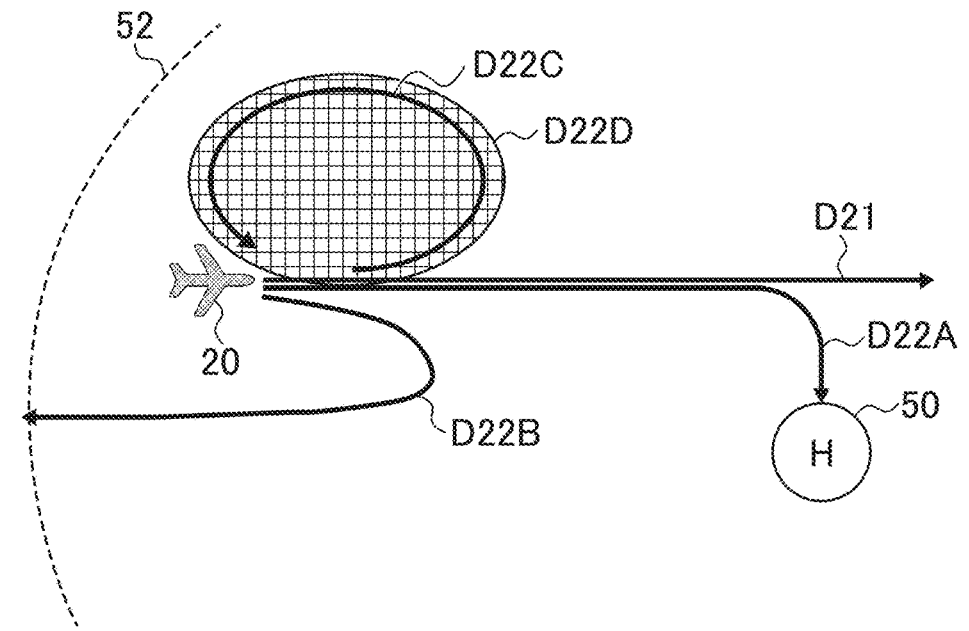
FIG. 4 is a schematic diagram illustrating a setting example of a secondary flight path according to the present invention.

While the secondary flight path D22 can be set as any shape or area, the safety can be increased by satisfying certain requirements. FIG. 4 shows a part of a setting example.

For example, in a case of a path to an emergency landing site 50 as shown in a secondary flight path D22A or a path to a point outside a controlled airspace 52 as shown in a secondary flight path D22B, the aircraft 20 can start a flight on the secondary flight path D22A or D22B, and then terminate the flight or move out of the controlled airspace of the control station 10 without requiring communication with the control station 10 and without the risk of interfering with a flight path of another aircraft. Therefore, even when the function of the control station 10 is stopped due to a failure or the like, the safe navigation can be continued.

For example, in a case of a path or area over which the aircraft 20 can continuously fly, such as an annular-shaped path shown in a secondary flight path D22C or an area shown in a secondary flight path D22D, the aircraft 20 can start a flight on the secondary flight path D22C, D22D, and then wait for an instruction on a new flight path from the control station 10 for an extended period of time.

In the first embodiment and the second embodiment described above, the secondary flight path D22 is illustrated as a path or an area in a horizontal plane for simplicity, but in practice, the aircraft can also move in the height direction, and a path or area may be set three-dimensionally including the height direction.

In the first embodiment and the second embodiment described above, examples of the shape of the secondary flight path D22 are shown, but combinations of a part or all of them can be considered as a secondary flight path.

Figure 5:
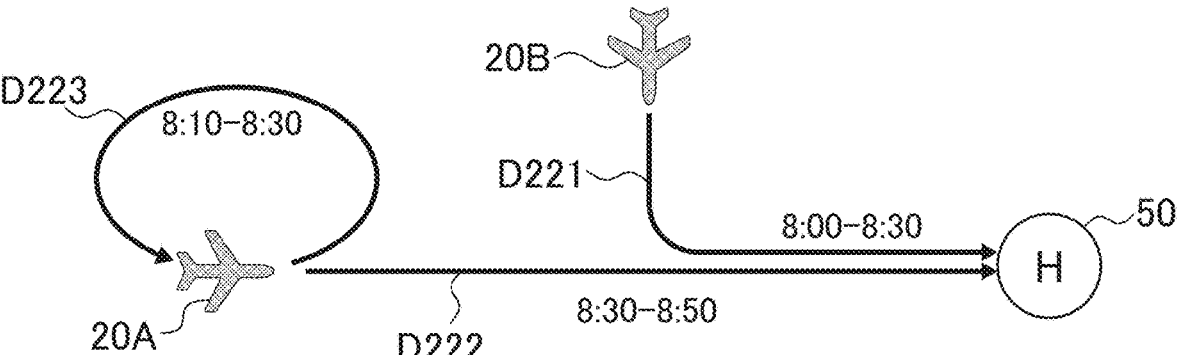
FIG. 5 is a schematic diagram when an available time is set for a section of the secondary flight path of the present invention.

The secondary flight path D22 may have an available time set for a part or all of the sections thereof. FIG. 5 is a diagram illustrating an example of a case in which the available time is set for the section of the secondary flight path D22 in an embodiment of the control system of the present invention.

An aircraft 20B is planned to land on the emergency landing site 50 using a secondary flight path D221, and an aircraft 20A is planned to land on the emergency landing site 50 using a secondary flight path D223 and a secondary flight path D222, respectively. Here, the times appended to the secondary flight paths D221 to D223 indicate the available times set for the flight path sections.

If no available time is set for the section of the secondary flight path, it is not possible to set such a secondary flight path since the secondary flight path D221 and the secondary flight path D222 will interfere with each other. However, by specifying the available time for the section of the secondary flight path, it is possible to set the secondary flight path that uses the same space while avoiding the risk of collisions between the aircrafts flying on the secondary flight path. Thus, the usage efficiency of the controlled airspace can be improved.

Alternatively, the predetermined condition L for using the secondary flight path that uses the same space may be set to a case in which it is confirmed that the aircraft flying in advance on the secondary flight path has finished using the flight path. In this embodiment, for example, by setting the predetermined condition L for using the secondary flight path D222 to a case in which it is confirmed that the aircraft 20B has finished using the secondary flight path D221, the aircraft 20A can confirm that the predetermined condition L has been satisfied by means such as communication from the aircraft 20B and safely enter the secondary flight path D222, making it possible to improve the usage efficiency of the controlled airspace.

Various methods can be considered for determining the interference of the flight path in the management unit 12. For example, a method can be considered in which a virtual occupied space is defined around a flight path by a space having a cylindrical shape or the like with a distance obtained by adding a part or all of an aircraft dimension, a positioning performance, a control error, and an allowable deviation range, and the presence or absence of the interference is determined based on the presence or absence of contact between the virtual occupied spaces.

While the embodiments of the present invention have been described above, the present invention is not limited to the above embodiments and includes various modifications other than those described above. For example, the present invention is not limited to one including all the configurations provided in the above-described embodiments. A part of a configuration of an embodiment can be removed or replaced with another configuration. Another configuration can be added to, removed from, or replaced with a part of a configuration of an embodiment.

REFERENCE SIGN LIST

10: control station
11: setting unit
12: management unit
13: control unit
14: communication unit
15: control unit
20: aircraft
21: flight control unit
22: flight path storage unit
23: communication unit
25: flight path determination unit
26: flight path storage unit
D21: primary flight path
D22: secondary flight path
35: obstacle
D22A: secondary flight path
D22B: secondary flight path
D22C: secondary flight path
D22D: secondary flight path
50: emergency landing site
52: controlled airspace
20B: aircraft
D221: secondary flight path
D223: secondary flight path
D222: secondary flight path

The invention claimed is:

1. A control device for an aircraft, the control device comprising:
a control unit that receives, from a first aircraft, information on the first aircraft and information on airspace around the first aircraft;
a setting unit that set, without an aircraft request for a flight path, for each of a plurality of aircraft including the first aircraft, a primary flight path as a normal flight path and one or more secondary flight paths to which a respective aircraft is permitted to switch based on satisfaction of a corresponding predetermined condition;
a management unit that avoids an interference of the primary flight path and the secondary flight path determined for the first aircraft with a primary flight path or a secondary flight path of other aircraft of the plurality of aircraft; and
the control unit configured to transmit the primary flight path, the predetermined condition, and the secondary flight path to the first aircraft to cause, at least in part, a flight control unit on the first aircraft to operate the first aircraft initially on the primary flight path and, when the predetermined condition is satisfied, drive at least one actuator to control the first aircraft to follow the secondary flight path.

2. The control device according to claim 1, wherein
the control unit transmits the primary flight path and the secondary flight path to the first aircraft together with the predetermined condition in advance, the primary flight path and the secondary flight path being established by the setting unit and confirmed by the management unit not to interfere with a primary flight path or a secondary flight path of another aircraft of a plurality of aircraft, and
an operation on the secondary flight path is determined by the first aircraft.

3. The control device according to claim 1, wherein
the setting unit sets the secondary flight path using a
destination point of each aircraft of a plurality of
aircraft and information on each aircraft including at
least one of: a possible flight time, a possible flight
distance, specifications, or a flight performance.

4. The control device according to claim 1, wherein
the setting unit sets a flight path terminating at a point
outside a control zone, a flight path terminating at a
landing point, a space required for hovering, a path or
airspace having an annular shape or the like that allows
a continuous flight, a space within a specified height
range, or a flight path including a combination thereof,
as the secondary flight path.

5. The control device according to claim 1, wherein
the setting unit specifies an available time for a part of or
all sections of a secondary flight path.

6. The control device according to claim 1, wherein
the management unit defines a virtual occupied space
around a flight path, the virtual occupied space being
specified by a part or all of an aircraft dimension, a
positioning performance, a control error, and an allow-
able deviation range, and manages a presence or
absence of an interference based on a presence or
absence of contact between the virtual occupied spaces.

7. The control device according to claim 1, wherein
for a part or all of the secondary flight paths shared by the
control unit, when there is no longer a possibility of
performing a flight using the secondary flight path, the
control unit receives a from the respective aircraft, an
indication that the secondary flight path is unnecessary
from the aircraft.

8. A control method for an aircraft, the method compris-
ing:

receiving, from a first aircraft, information on the first
aircraft and information on airspace around the first
aircraft;

setting, without an aircraft request for a flight path, for
each of a plurality of aircraft including the first aircraft,
a primary flight path as a normal flight path and one or
more secondary flight paths to which a respective
aircraft is permitted to switch based on satisfaction of
a corresponding predetermined condition;

avoiding an interference of the primary flight path and the
secondary flight path determined for the first aircraft
with a primary flight path or a secondary flight path of
other aircraft of the plurality of aircraft; and transmitting the primary flight path, the predetermined
condition, and the secondary flight path to the first
aircraft to cause, at least in part, a flight control unit on
the first aircraft to operate the first aircraft initially on
the primary flight path and, when the predetermined
condition is satisfied, drive at least one actuator to
control the first aircraft to follow the secondary flight
path.

9. The control method according to claim 8, further
comprising transmitting the primary flight path and the secondary
flight path to the first aircraft together with the prede-
termined condition in advance, the primary flight path
and the secondary flight path being confirmed not to
interfere with a primary flight path or a secondary flight
path of another aircraft of a plurality of aircraft, and determining an operation on the secondary flight path by
the first aircraft.

* * * * *